United States Patent [19]
Drozek et al.

[11] 3,841,567
[45] Oct. 15, 1974

[54] EXTRUSION NOZZLE

[75] Inventors: Julius S. Drozek, Lorain; Richard A. Horvath; Burton J. Vilagi, both of Amherst, all of Ohio

[73] Assignee: Mardson Corporation, Amherst, Ohio

[22] Filed: July 23, 1973

[21] Appl. No.: 381,766

[52] U.S. Cl. ............................................. 239/570
[51] Int. Cl. ............................................. B05b 1/30
[58] Field of Search ......... 239/570, 572, 91, 92, 95; 222/71

[56] References Cited
UNITED STATES PATENTS

| | | |
|---|---|---|
| 2,614,888 | 10/1952 | Nichols ............................ 239/570 |
| 2,896,856 | 7/1959 | Kravits ............................ 239/570 |
| 2,899,018 | 8/1959 | Booth ............................. 239/570 |
| 2,912,169 | 11/1959 | Peffer, Jr. ......................... 239/570 |

*Primary Examiner*—Lloyd L. King
*Attorney, Agent, or Firm*—Thomas L. Moorhead, Wood, Herron & Evans

[57] ABSTRACT

An extrusion nozzle having a minimum volume cavity at one end of the outlet orifice supply passage and a minimal lip area defined by an externally tapered nozzle extremity adjacent the orifice. The combination of the minimum volume cavity and the minimal lip area of the nozzle reduces the phenomenon of extruded compound material dripping from or building up on the outlet end of the nozzle.

14 Claims, 12 Drawing Figures

PATENTED OCT 15 1974

EXTRUSION NOZZLE

BACKGROUND OF INVENTION

This invention relates to an extrusion nozzle for use in the manufacture of metal can ends and more particularly to the application of sealing compound to the ends before they are crimped onto the bodies during assembly.

Metal cans are made by either drawing a cup from a cylindrical slug of metal, and then attaching a single end to the drawn cup, or by forming a cylindrical can body from a sheet of metal and then attaching two ends to the opposite ends of the body.

After the can ends are completely shaped but before the end or ends are assembled onto the body, a peripheral groove of the can end is coated with "compound," generally a resilient latex or rubber-like material. When the lid is subsequently crimped onto the can body, this "compound" forms an elastomeric seal in the joint between the can end and the can body.

At the present time there are three different types of compounds commonly used to seal can ends onto can bodies. One type is a thermoplastic hot melt compound which is generally applied at 350° F. Another type is a water base latex gasket material which is applied at ambient or room temperature, generally on the order of 77° F. The third type is an organic solvent compound which may be applied from room temperature to 140° F. but is generally applied at approximately 110° F. All of these different types of "compounds" are commonly applied by an extrusion nozzle.

The most common present commercial practice is to supply the compound material to an extrusion nozzle within which there is located a reciprocating plunger. On the up stroke of the plunger, a charge or slug of compound is injected into a nozzle extrusion chamber at approximately 60 pounds per square inch. On the down stroke of the plunger, this charge or slug of "compound" is forced out of the extrusion nozzle onto a horizontally located can end which is rotating about a vertical axis. In general, the practice is to mechanically actuate the reciprocating plunger by means of a hold-down pad located on top of the end which moves vertically to effect clamping of the end into a rotating chuck at the compound application station. This plunger type of extrusion process has been in use for some time but it is subject to numerous criticisms; namely, that there is excessive nozzle breakage which results from impact of the plunger with the nozzle, poor cut off of flow from the nozzle orifice with resulting stringing and dripping or drooling of material onto the end, unevenness of application of compound to the end, and excessive bubbling and blistering of the compound.

Most of the aforementioned objections to the convenitonal plunger type compound extruding process have been overcome by high pressure small nozzle orifice extrusion processes, which are the subject of co-pending U.S. Pat. application, Ser. No. 246,392, filed Apr. 21, 1972, which application is assigned to the assignee of this application. We have found that the process disclosed in that application does not solve all of the production problems encountered in "compound" applications. More specifically, we have found that stringing or drooling of compound from the end of the nozzle after cut-off or closing of the valve is less of a problem than with the plunger type applicator, but it is still present and sometimes objectionable. We have also found that unless the "compound" is very precisely mixed and the application temperature closely controlled, the viscosity and rheological properties of the material may prevent it from flowing radially outwardly under the lip of the can curl.

SUMMARY OF INVENTION

It was discovered and one aspect of this invention is predicated upon the discovery that a cause of dripping and stringing of the compound from the nozzle orifice was the location of a relatively large cavity at the top of the nozzle orifice supply passage. It was further discovered that the compound material had a tendency to drip and string from this cavity down through the orifice supply passage of the nozzle and onto the can end even after a valve of the nozzle located immediately above this cavity was shut off.

It was also discovered and another aspect of this invention is predicated upon the discovery that a relatively blunt exterior end on the nozzle tip permitted extruded "compound" to build up on the end of the nozzle. By sharpening the end of the nozzle so that it had a thin or reduced end lip area, it was discovered that the extrusion material had far less of an area on which to attach itself and, therefore, would not build up in excess on the end of the nozzle.

We discovered that by providing the nozzle with a minimum volume cavity at the upper end of the nozzle orifice supply passage the problem of stringing or dripping of compound was reduced. However, there was still a tendency for compound to build up on the nozzle tip. Not until we combined both a minimum volume cavity above the nozzle supply passage with a nozzle tip having a minimal end lip area did we achieve a substantial improvement in operational results of a compound extrusion nozzle. These improvements resulted in a minimum amount of build up of "compound" material on the nozzle tip and prevented dripping and stringing.

This invention provides a nozzle in which there is no stringing or drooling of the compound onto the can end, or any excessive build up of compound on the tip of the nozzle.

An extrusion nozzle having these improvements limits the build up of compound material on the extrusion nozzle tip to the minimal snap back of the compound which in no way interferes with the compounding or extrusion operation. This eliminates the need for frequent shut-downs for cleaning the nozzle tip. The improved extrusion nozzle as previously set forth is incorporated in a compound extruding system which is capable of operating at 3,000 cycles per minute. Normal production speeds of compound lining are in the range of 200 to 600 lids or cycles per minute.

Generally speaking, the improved extrusion nozzle is capable of extruding compound sealants in the viscosity range of 1,000 to 20,000 cps. (centipoise) and at an average rate of deposition of 80 mgs per can end.

The operational pressure used for the application or extrusion of such compounds is usually set between 300 and 600 psi. By using high pressure extrusion in this pressure range, this system is less sensitive to minor pressure fluctuations and the slight differences in compound viscosity and the rheology that often occur from batch to batch in sealant compounds.

While the discussion thus far has covered the application of extrusion compound materials, it is to be understood that other types of material may also be extruded from the type of nozzle disclosed and claimed in this application; e.g., tests have also been conducted wherein hot melt adhesives have been successfully extruded from our improved extrusion nozzle.

BRIEF DESCRIPTION OF THE DRAWINGS

Other objects and advantages of the present invention will become apparent upon reading the following detailed description and upon reference to the drawings, in which.

DETAILED DESCRIPTION OF THE DISCLOSURE

Figure 1:
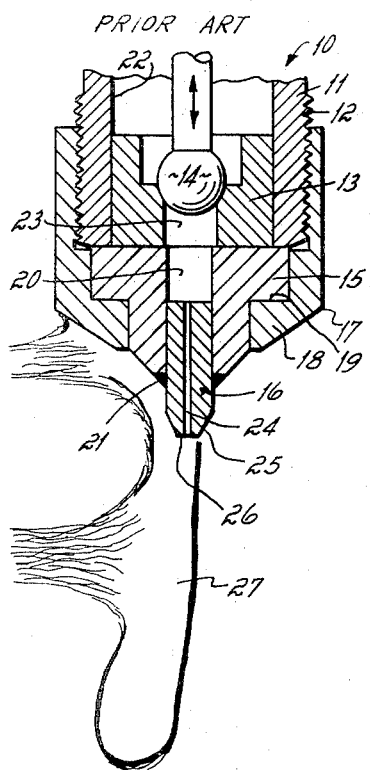
FIG. 1 is an enlarged view in section of a prior art nozzle assembly illustrating stringing of extruded compound material issuing from the nozzle and the resultant build up of compound derived from that stringing.
Figure 12:
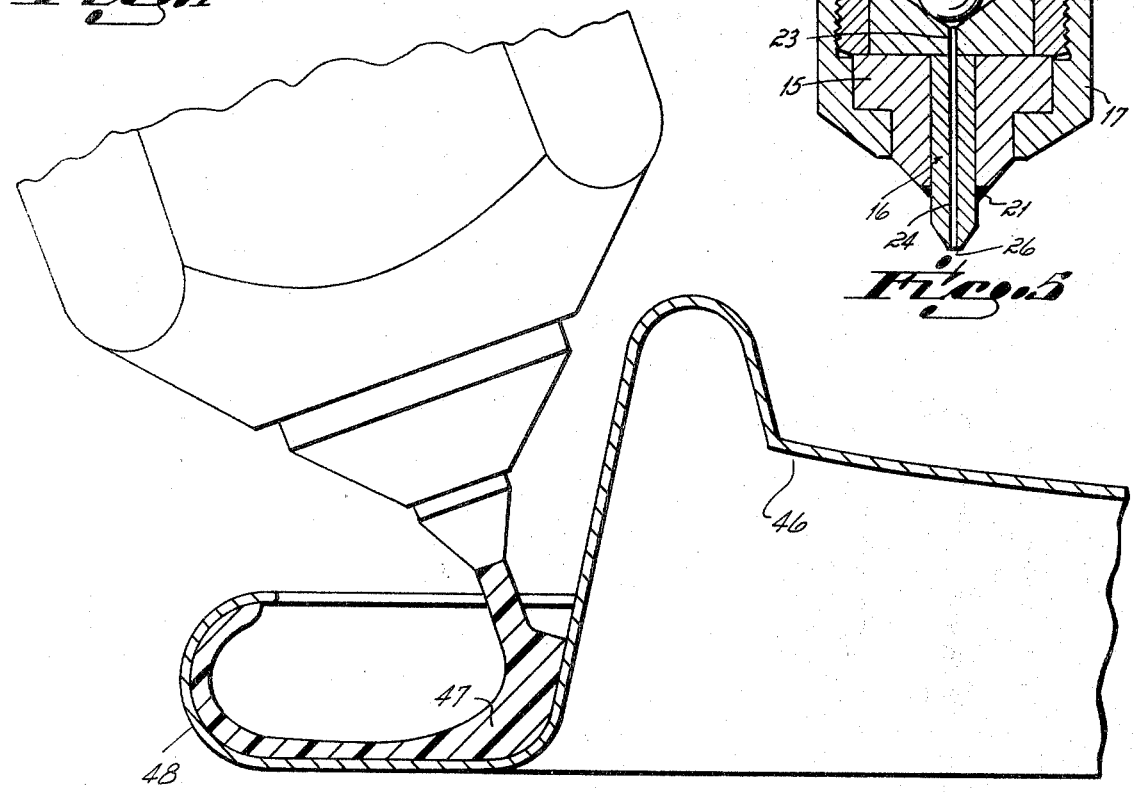
FIG. 12 is an enlarged view partially in elevation and section showing the extrusion nozzle in the position for extruding compound material in the shoulder of a can lid.

Referring first to FIG. 1 of the drawings, there is illustrated a prior art extrusion nozzle assembly 10 secured to the outer end of a nozzle adapter 11. The purpose of this nozzle adapter 11 is to enable the nozzle assembly to be placed in close proximity to the curl of a can end for application of a compound material to the curl of a can end as illustrated in FIG. 12. The nozzle adapter 11 is part of a material dispenser or gun such as is disclosed in co-pending U.S. Pat. application, Ser. No. 246,392, filed Apr. 21, 1972, and assigned to the assignee of this application.

The adapter 11 has a threaded tubular extension 12, a valve seat 13 and reciprocating valve element 14 which cooperates therewith. A nozzle holder 15 and nozzle tip 16 are secured to the end of the nozzle adapter 11 by a nut 17 which has a flanged lip portion 18 which engages a radial flange 19 on the nozzle holder 15 and thereby secures the nozzle holder 15 and the nozzle tip 16 to the end of the threaded tubular extension 12 of nozzle adapter 11. The nozzle tip 16 is disposed in the central bore 20 of nozzle holder 15 and is secured thereto by brazing as indicated at 21.

An axial bore 22 in the nozzle adapter 11 is in communication with bore 23 of valve seat 13, bore 20 of nozzle holder 15 and nozzle passage 24 of nozzle tip 16.

It is to be noted that the volumes of the bores 20 and 23 combine to form a relatively large cavity below the point of sealing engagement of the valve 14 and valve seat 13. In the prior art nozzles depicted in FIG. 1, the volume of the cavity in bores 20 and 23 above the tip 16 was always in excess of $4.1 \times 10^{-4}$ in$^3$.

Figures 3, 4:
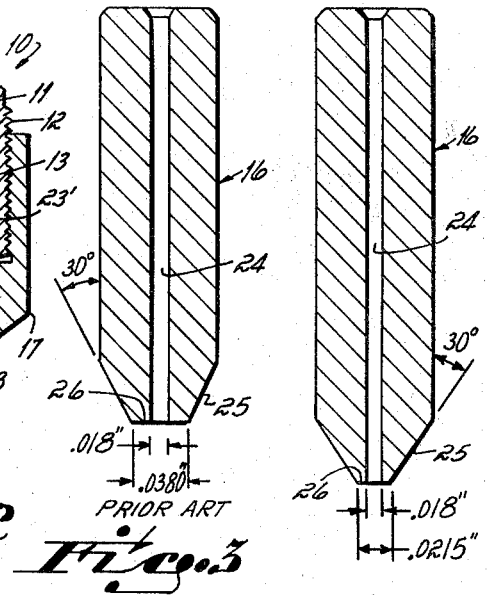
FIG. 3 is an enlarged view in section of the nozzle capillary tube in FIG. 1 of the drawings.
FIG. 4 is an enlarged view in section of the capillary tube in FIG. 2 of the drawings.

It should also be noted that the nozzle tip 16 has an external taper 25 which cooperates with the nozzle passage 24 to form a relatively blunt lip area 26 (FIG. 3). In the prior art nozzles of the type depicted in FIG. 1, the end lip area (the area of the end 26) was always at least $10.9 \times 10^{-5}$ in$^2$. During testing and use of the nozzle assembly 10 compound was supplied to the chamber 22 at a pressure which generally ranged between 300 and 600 p.s.i., depending upon the compound employed and the application conditions. We discovered that compound material had a tendency to collect in the large cavities formed by bores 20 and 23 above the top end of the nozzle tip 16 and drip or drool through passage 24 of nozzle tip 16. In addition, we discovered that the dripping compound material had a tendency to stick to the relatively large end lip area 26 of nozzle tip 16 and develop into the "cobweb" type flow pattern 27 depicted in FIG. 1. The lateral disposition of the "cobweb" type flow pattern to the left of the nozzle tip 16 was caused by air currents created by rotation of can ends and heads which rotate the can ends at speeds of approximately 2,000 rpm while compound is applied to the ends. The rotation of the ends and the rotating heads of the can machinery at this speed creates air currents which tend to urge any stringing compound material toward one side of the nozzle assembly. The can machinery referred to herein is more fully disclosed in the co-pending U.S. Pat. application Ser. No. 246,392 which is assigned to the assignee of this application.

Figure 2:
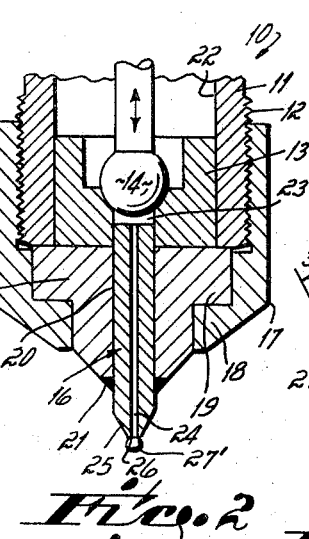
FIG. 2 is an enlarged view in section of the preferred embodiment of the extrusion nozzle of this invention illustrating the resultant build up of compound derived from the use of this nozzle.

Referring now to FIG. 2 of the drawings, there is illustrated a nozzle assembly which incorporates the invention of this application. The nozzle assembly shown herein is identical to that depicted in FIG. 1 except that 1. it contains a lip area on the end of nozzle tip 16 which has been reduced to the dimensions indicated on the nozzle tip 16 in FIG. 4 of the drawings, and
2. it has a cavity 23' with a substantially reduced volume above the upper end of the nozzle tip 16.

Specifically, the volume of the chamber 23' of this embodiment was approximately $0.47 \times 10^{-4}$ in$^3$.

The resultant flow pattern build up of the compound material on the end of the nozzle tip is indicated at 27'. It will be seen that this nozzle assembly virtually eliminated stringing or dooling, as well as "build-up" 27' of compound material on the end lip area 26 of the nozzle tip 16.

In addition, the droplet of compound 27' is so small in size that it is readily urged away from the end lip area 26 during normal cyclic operation of the extruder or gun and without detrimental effect to the pattern of the compound being applied to a surface.

It is to be noted that the nozzle assemblies illustrated in FIGS. 1 and 2 were tested under the same operating conditions wherein the material extruder or gun with the aforementioned nozzle assemblies attached thereto were tested at 250, 500, 750 operational cycles. The system pressure was 500 psi. The compound material that was extruded through the nozzle assemblies was manufactured by Dewey and Almy and is known as extrusion compound material No. 9101-y. The extrusion compound No. 9101-y has a viscosity ranging from 2,000 to 2,500 cps (centipoise) at temperatures ranging from 70° to 110° F. Other extrusion materials were successfully tested but the build up depicted at 27, 27' was that obtained under the conditions set forth hereinabove.

The nozzle tip 16 of the prior art nozzle depicted in FIGS. 1 and 3 of the drawings has an end lip area 26 of $88 \times 10^{-5}$ in$^2$. The improved nozzle tip 16 in FIGS. 2 and 4 of the drawings has an end lip area 26 of $10.9 \times 10^{-5}$ in$^2$. Therefore, it will be seen by comparing the respective end lip areas 26 of the nozzle tips 16 in FIGS. 3 and 4 that the nozzle tip 16 in FIG. 4 of the drawings has an end lip area 26 which is approximately 88 percent less than the end lip area 26 of nozzle tip 16 in FIG. 3 of the drawings. The minimal end lip area of nozzle tip 16 in FIG. 4 of the drawings substantially reduces the phenomenon or tendency of "build-up" of extruded compound material on the end lip area 26. "Build-up" occurs at the time of gun shutoff and is caused by the "snap-back" of part of the liquid latex type compound material when the valve 14 is suddenly closed. In addition, after the valve 14 is closed the compound is still under pressure in cavity (20, 23 in FIG. 1 of the drawings) and for a short period of time tends to expand outwardly through orifice 24 due to the pressure differential between the cavity and the atmospheric pressure outside lower end of nozzle tip 16. Also contributing to this phenomenon is the use of low boiling point solvents in compound materials which boil off or evaporate thus causing displacement of compound material through orifice 24.

The nozzle assemblies illustrated in FIGS. 5 through 11 depict various other nozzle assemblies which are constructed according to the teachings of this invention.

Figure 5:
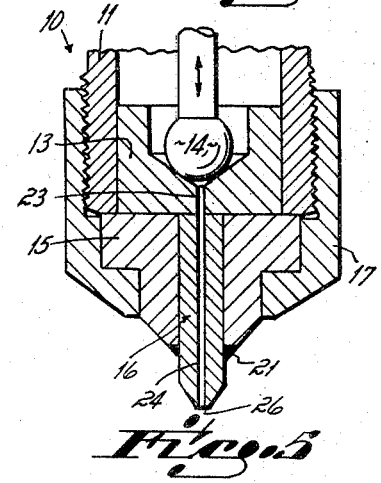
FIG. 5 is an enlarged view in section of another embodiment of the extrusion nozzle of this invention.

In FIG. 5 of the drawings it will be seen that the nozzle assembly 10 has been modified to the extent that the bore 23 of valve seat 13 is now approximately the same diameter as the nozzle passage 24 of nozzle tip 16. The nozzle tip 16 is mounted in holder 15 by means of brazing at 21. The upper end 28 of nozzle tip 16 is flush with the end face 29 of nozzle holder 15. The nozzle holder 15 and nozzle tip 16 are held in abutting engagement with the valve seat 13 by a threaded nut 17 which is secured to the nozzle adpater 11.

A minimum volume cavity 30 is formed below valve 14 and the tapered seat portion 31 of valve seat 13. It is to be noted that the volume cavity 30 is in this embodiment less than that of the cavity 23' of FIG. 2 ($0.47 \times 10^{-4}$ in$^3$) and the end lip area 26 is $10.9 \times 10^{-5}$ in$^2$.

Nozzle assemblies may be constructed wherein the orifice 24 of nozzle tip 16 may vary in size; e.g., from 0.012 inch to 0.024 inch. However, the end lip area 26 of nozzle tip 16 should not exceed $27.7 \times 10^{-5}$ in$^2$ for the best operational results. Stated in another way, the wall thickness or distance across the end lip should be approximately 0.001 inch to 0.003 inch.

Figure 6:
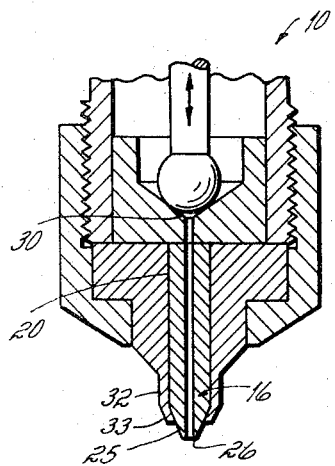
FIG. 6 is an enlarged view in section of an alternate embodiment of the nozzle in FIG. 5 of the drawings.

Referring now to FIG. 6 of the drawings, it will be seen that the nozzle assembly 10 is essentially the same as the nozzle assembly shown in FIG. 5 of the drawings. However, the nozzle tip 16 is snuggly secured in bore 20 and is retained therein by a thin tubular end wall section 32 which is mechanically swaged at end portion 33 into engagement with the tapered end portion 25 of nozzle tip 16.

Figure 7:
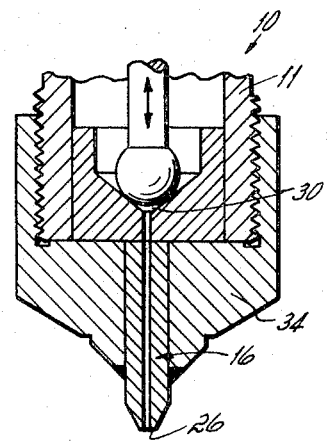
FIG. 7 is an enlarged view in section of another alternate embodiment of the nozzle in FIG. 5 of the drawings.

Referring to FIG. 7 of the drawings, the nozzle assembly 10 has been modified to the extent that the nozzle tip 16 is secured in a one piece nozzle 34 which is threadedly secured to the nozzle adapter 11.

Figure 8:
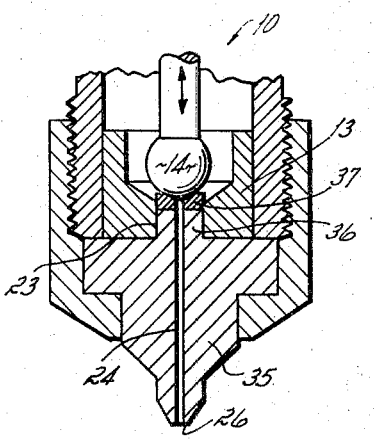
FIG. 8 is an enlarged view in section of still another alternate embodiment of an extrusion nozzle.
Figure 9:
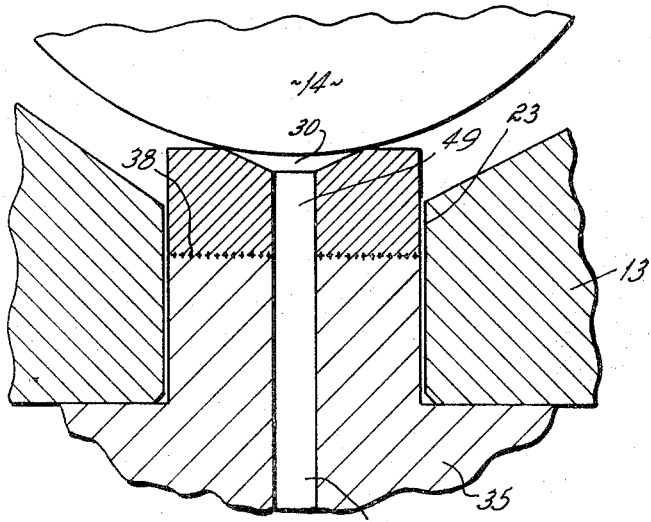
FIG. 9 is a greatly enlarged fragmentary view in section of the valve and valve seat of the nozzle in FIG. 8.

Referring now to FIGS. 8 and 9 of the drawings, it will be seen that a further modification is made in that a unitary or one piece nozzle tip and holder 35 has been provided. The upper end portion of 35 is formed into a hub 36 which extends into bore 23 of valve seat 13. A carbide seat 37 with an orifice 49 formed therein is secured to the top of the hub 36 by means of brazing the co-mating surfaces of the hub 36 and seat 37 as illustrated at 38. The orifice 49 is axially aligned with orifice 24 so that a smooth path is provided for compound being extruded therethrough.

The primary purpose of the carbide seat 37 is to provide a hardened valve seat which will resist wear due to the impact of valve 14 during cyclic operation. For sake of clarity, refer to FIG. 9 of the drawings wherein the elements of the nozzle assembly 10 are illustrated in a greatly enlarged fragmentary view in section.

Figure 10:
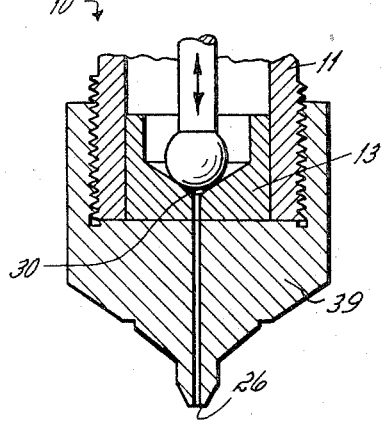
FIG. 10 is an enlarged view in section of another form of extrusion nozzle.

Referring to FIG. 10 of the drawings, it will be seen that the nozzle assembly 10 shown herein is similar to the nozzle assembly shown in FIG. 7 of the drawings; however, the nozzle tip 16 and one piece nozzle holder 34 are replaced by a one piece threaded nozzle 39 which is threadedly secured to the nozzle adapter 11. It is to be noted that the valve seat 13 may also be made of a highly wear-resistant material such as carbide.

Figure 11:
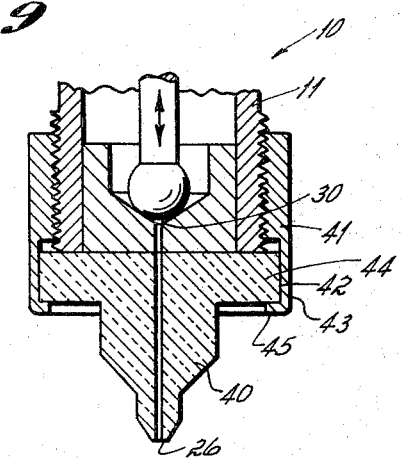
FIG. 11 is an enlarged view in section of still another form of extrusion nozzle.

As illustrated in FIG. 11 of the drawings and in conformance with the invention, the nozzle assembly 10 includes a highly wear-resistant material in the form of a ceramic nozzle 40 which is retained in a threaded nut 41 secured to the nozzle adapter 11. Nozzle 40 is disposed in bore 42 of nut 41 and is retained therein by a thin walled section 43 which is swaged or crimped around the edge of flange 44 of nozzle 40. The swaged portion of the thin walled section 43 being illustrated at 45.

The aforementioned method of securing the nozzle 40 to nut 41 by means of swaging or crimping is only one of several methods which may be used. More specifically, the nozzle 40 may be secured to nut 41 by bonding them together with an epoxy cement.

Another method involves heat-shrinking the thin walled section over the ceramic nozzle 40.

Still another method is to metallize the co-mating surfaces of the nozzle 40 and inside surface of the thin walled section 43 of nut 41 and secure them together by brazing.

The nozzle 40 may be of metal oxide ceramic composite materials which have a high resistance to wear and corrosion such as, a high aluminum oxide (alumina) ceramic. In addition, the nozzle 40 may also be made of a composite material such as beryllium oxide (beryllia) ceramic. Beryllia ceramic is also a polycrystalline material which has a low thermal expansion, high resistance to wear and corrosion, as well as high thermal conductivity characteristics. An extrusion nozzle made of a beryllia ceramic material can be used when extruding heated compound material or hot melt adhesive materials. The primary object in using this type of nozzle is to provide a nozzle that remains approximately the same temperature as the hot material being extruded thorugh it. The heat is transferred from the heated compound materials through the nozzle 40 to the surrounding atmosphere.

Generally speaking, alumina and beryllia ceramics are impervious polycrystalline materials which have the following desirable properties: high mechanical strength, extreme hardness, inertness, refractoriness and high chemical resistance.

The alumina and beryllia ceramic materials referred to herein may be obtained from the Coors Porcelain Company, Golden, Colorado. Any of the following Coors Porcelain Company materials would be suitable to make extrusion nozzles:

| Alumina ceramic | Beryllia ceramic |
| --- | --- |
| AD - 85 | BD - 96 |
| AD - 90 | BD - 995 - 2 |
| AD - 94 | |
| AD - 999 | |

The nozzle assemblies illustrated in FIGS. 2 and 5 through 11 of the drawings depict various novel embodiments which may be assembled according to the teachings of this invention. In addition, it should be noted that all of these embodiments include a minimum volume cavity 30 which is no greater than $0.47 \times 10^{-4}$ in$^3$, and a minimal end lip area 26 which is no greater than $27.7 \times 10^{-5}$ in$^2$.

FIG. 12 is an enlarged view partially in elevation and section showing the extrusion nozzle assembly 10 in a position relative to a can lid 46 and extruding compound material 47 into the lip section 48 of can lid 46.

It is to be understood that while the detailed drawings and specific examples given describe preferred embodiments of the invention they are for the purpose of illustration only, that the apparatus of the invention is not limited to the precise details and conditions disclosed, and that various changes may be made therein without departing from the spirit of the invention which are defined by the following claims.

We claim:

1. An extrusion nozzle assembly for extruding viscous liquid material at a pressure of at least 2,000 pounds per square inch, said nozzle assembly being adapted to be removably secured to the end of a fluid dispenser, said nozzle assembly including a valve element and a valve seat, said valve element being disposed in said dispenser and operatively cooperable with said valve seat to control the flow of material through said nozzle assembly, a nozzle tip mounted below said valve seat and having a through passage, said passage being in fluid communication at one end with said valve seat, said nozzle passage terminating at the end opposite said one end in an outlet orifice, a minimum volume cavity adjacent to said valve element and said valve seat of no greater than approximately $0.47 \times 10^{-4}$ in$^3$, and said opposite end of said passage being surrounded by an externally tapered surface of said nozzle tip which cooperates with said orifice to form a minimal end lip area of no greater than approximately $27.7 \times 10^{-5}$ in$^2$.

2. The nozzle assembly of claim 1 wherein said nozzle assembly includes, a nozzle holder, said nozzle tip being fixedly secured in said holder by swaging a thin walled section of said holder into engagement with said nozzle tip.

3. The nozzle assembly of claim 2 wherein said nozzle tip is made of a non-metallic material.

4. The nozzle assembly of claim 3 wherein said nozzle tip is made of ceramic material.

5. The nozzle of claim 1 wherein said nozzle assembly comprises a nozzle tip in the form of a capillary tube mounted in a holder.

6. The nozzle of claim 5 wherein said capillary tube is fixedly secured in said holder and is in abutting engagement with said valve seat.

7. The nozzle of claim 6 wherein said capillary tube is fixedly secured in said holder by brazing said tube to said holder.

8. The nozzle of claim 6 wherein said capillary tube is secured in said holder by swaging a thin walled section of said holder into engagement with said capillary tube.

9. The nozzle assembly of claim 1 wherein said valve seat is made of carbide and is secured to said nozzle tip.

10. The nozzle assembly of claim 9 wherein said valve seat is secured to a hub on the upper end of said nozzle tip by means of brazing.

11. The nozzle assembly of claim 1 wherein said nozzle is mounted below said valve seat by means of a threaded nut, said nozzle is made of ceramic material and, retained in one end of said nut by swaging a thin walled section of said nut around said nozzle.

12. The nozzle assembly of claim 1 wherein said nozzle is made of a ceramic composite of high thermal conductivity.

13. The nozzle assembly of claim 1 wherein said nozzle is made of an alumina ceramic material 14. The nozzle assembly of claim 12 wherein said nozzle is made of a beryllia ceramic material.

* * * * *

UNITED STATES PATENT OFFICE
CERTIFICATE OF CORRECTION

Patent No. 3,841,567　　　　　　　　　　Dated October 15, 1974

Inventor(s) Julius S. Drozek, Richard A. Horvath and Burton J. Vilagi

It is certified that error appears in the above-identified patent and that said Letters Patent are hereby corrected as shown below:

Page 1 following "Assignee" change "Mardson Corporation" to --- Nordson Corporation ---

Column 4 line 62 "dooling" should be --- drooling ---

Column 5 line 57 "adpater" should be --- adapter ---

Column 7 line 9 "thorugh" should be --- through ---

Signed and sealed this 11th day of February 1975.

(SEAL)
Attest:

RUTH C. MASON
Attesting Officer

C. MARSHALL DANN
Commissioner of Patents
and Trademarks